Figure 1:
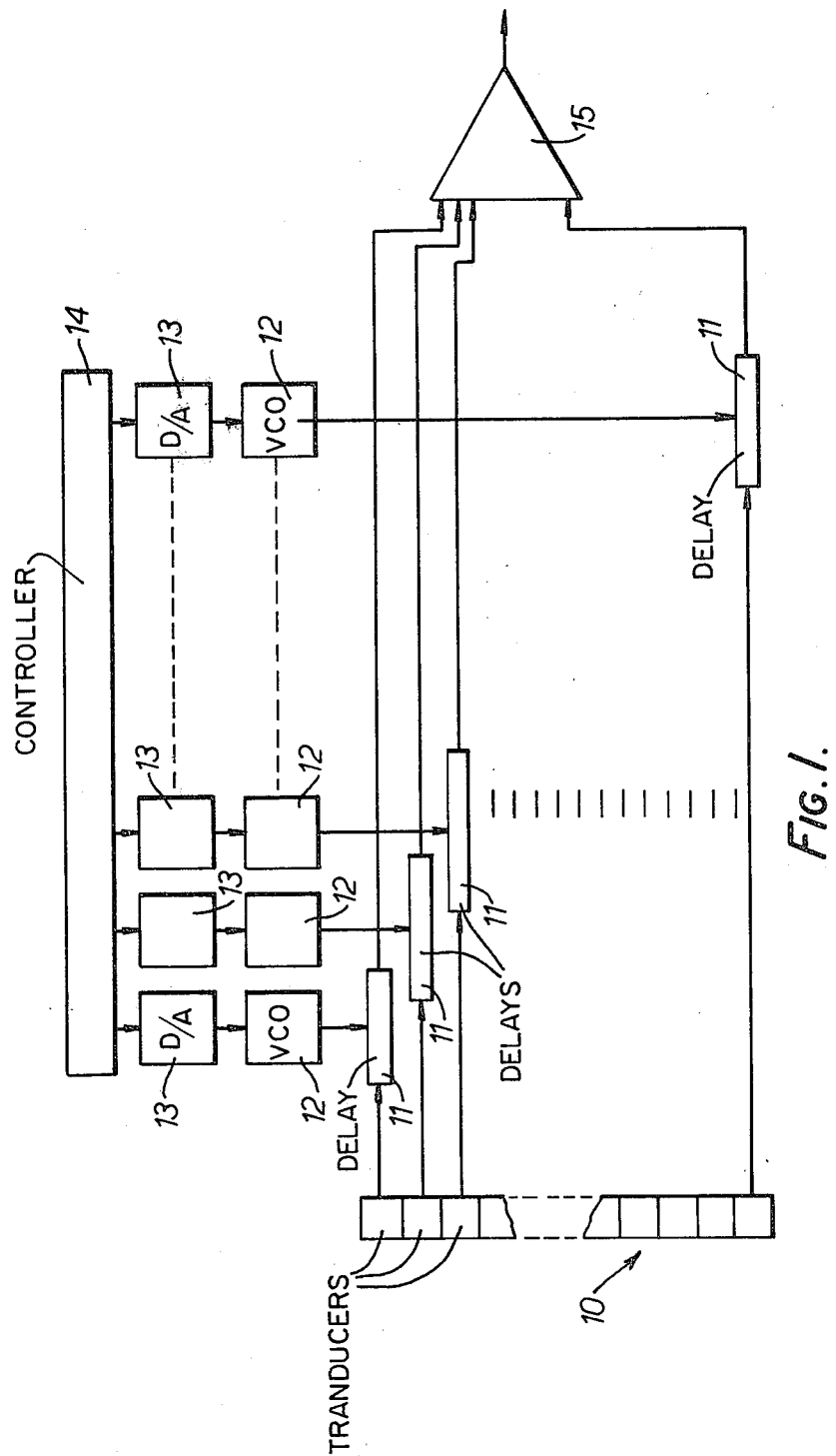

United States Patent [19]
Gill

[11] 4,334,432
[45] Jun. 15, 1982

[54] ULTRASONIC LINEAR ARRAY BEAMFORMING METHOD AND APPARATUS

[75] Inventor: Robert W. Gill, Rozelle, Australia

[73] Assignee: The Commonwealth of Australia - Dept. of Health, Australia

[21] Appl. No.: 122,602

[22] Filed: Feb. 19, 1980

[30] Foreign Application Priority Data

Feb. 20, 1979 [AU] Australia .............................. PD7760

[51] Int. Cl.³ ............................................. G01N 29/00
[52] U.S. Cl. ...................................... 73/602; 73/625; 367/103
[58] Field of Search ................. 73/625, 626, 628, 641, 73/602; 367/103, 105, 138; 128/660

[56] References Cited

U.S. PATENT DOCUMENTS

| | | | |
|---|---|---|---|
| 4,019,169 | 4/1977 | Takamizawa | 73/626 |
| 4,058,003 | 11/1977 | Macovski | 73/626 |
| 4,152,678 | 5/1979 | Shott et al. | 367/103 |
| 4,252,025 | 2/1981 | Robinson | 73/626 |

*Primary Examiner*—Stephen A. Kreitman

[57] ABSTRACT

Steering and focusing acoustic beams in ultrasonic echoscopy, and in other acoustic techniques, can be effected using linear arrays of acoustic transducers. The focusing and steering can be improved by using linked delay lines connected to the transducers when the transducers operate in a receive mode, with delay values which are both linear and quadratic values of the distance of the respective transducer from the center of the array.

8 Claims, 2 Drawing Figures

ULTRASONIC LINEAR ARRAY BEAMFORMING METHOD AND APPARATUS

This invention concerns the steering and focusing of ultrasonic beams. More particularly it relates to a method and apparatus for electronic beam steering and focusing of linear arrays of ultrasonic transducers. It is an extension of known techniques of ultrasonic echoscopy. Using the present invention it is possible to provide more useful information concerning objects examined by ultrasonic echoscopy. It is particularly, but not solely, applicable to the more effective acquisition of data in medical diagnosis utilising ultrasonic echoscopy.

Ultrasonic echoscopy provides information about an examined object which may be displayed in the form of an ultrasonic echogram. Such an echogram consists of a display of acoustic impedance discontinuities or reflecting surfaces in the object. It is obtained by directing a short pulse of ultrasonic energy, typically in the frequency range of from 1 MHz to 30 MHz, into the examined object and observing the energy that is reflected, as an echo, from any acoustic impedance discontinuities in the object. This echo that is received is converted into an electric signal and displayed as an echogram on a cathode ray oscilloscope, a film, a chart or the like.

The echogram may constitute either a one dimensional or a two dimensional representation. In both cases the information in the echogram is contained in the position and magnitude of the echo displayed. Such echograms have been widely described. For example, their use in the application of ultrasonic echoscopy to medical diagnosis, in order to obtain information about the anatomy of patients, has been described by D. E. Robinson in his paper in "Proceedings of the Institution of Radio and Electronics Engineers, Australia" (Volume 31, No. 11, pages 385–392, 1970) entitled "The Application of Ultrasound in Medical Diagnosis". As pointed out in that paper, ultrasonic echography has proved of particular value as a diagnostic aid in the abdomen and pregnant uterus, eye, breast, brain, lung, kidney, liver and heart, these being areas of soft tissue with little bone and air. In general, ultrasonic echograms have been considered to complement other techniques to provide a more complete picture of the patient's condition. However, particularly in pregnancies, ultrasonic echoscopy may be useful in place of X-rays where the latter may not give sufficient information or may be dangerous.

The way in which ultrasonic echoscopy has been used in the medical field has also been described in the specifications of Australian patent applications Nos. 46,107/79 and 49,123/79 (corresponding to U.S. patent applications Ser. Nos. 31,538 and 61,645, now U.S. Pat. No. 4,252,025, Japanese patent applications Nos. 47339/79 and 99368/79, British patent application No. 79 12743 and European patent application No. 79 301548.8 respectively.)

In ultrasonic echoscopy, linear arrays of ultrasonic transducers have been used to obtain rapid scanning of a given region. The scanning is effected by (a) switching between the several transducer elements of the array, (b) beam steering and focusing, or (c) a combination of these techniques. The present invention constitutes an improvement of the known beam steering and focusing methods and an apparatus for applying the new method. The present invention is particularly, but not solely, directed to the use of the array as a receiver of ultrasonic echoes.

One form of the prior art linear array scanning arrangement using beam steering and focusing has a separate independent delay circuit for each element of the transducer array. Such an arrangement requires a large number of delay circuits, each with its own delay function versus time. Typically a charge coupled device (CCD) is used for the delay circuit of each transducer and each separate CCD delay line requires its own clock drivers, clock generator and clock control voltage. The result is an arrangement of relatively large physical volume and circuit complexity. (A charge coupled device or CCD is an integrated circuit device which samples an incoming signal at a rate f, where f is the clock frequency; the samples are then transferred along a series of N storage elements within the CCD, where N is its length, emerging from the last stage of the CCD to give, after suitable filtering, a replica of the input signal delayed by an amount N/f; the time delay can thus be altered by changing the length of the CCD or by varying the clock frequency.)

Another form of linear array scanning of the prior art avoids large size and circuit complexity by using linked delay elements whose delay values have a fixed relationship to one another, and whose delays are controlled by only a small number of control voltages. Such an arrangement is described by A. Macovski in his paper in "Proceedings of the IEEE", Volume 67, Nov. 4, 1979, pages 484–495 entitled "Ultrasonic imaging using arrays". In the case of CCD delays, for example, CCDs of different lengths can be used, all driven by the same clock generator and clock control voltage and all integrated into a single integrated circuit, with a resulting economy of space and complexity.

Mathematically, the delay, T, relative to the centre of the array for a transducer element at a distance x from the centre of the array is given by the relationship $$T = \frac{r}{c} \left\{ \left[ 1 + 2\left(\frac{x}{r}\right) \sin\theta + \left(\frac{x}{r}\right)^2 \right]^{\frac{1}{2}} - 1 \right\}, \quad (1)$$

where r is the distance of the desired focus point from the centre of the array, c is the velocity of propagation and $\theta$ is the desired steering angle. In the paraxial approximation (that is, when r is much greater than x and $\theta$ is small) this is well approximated by $T_1$, where $$T_1 = \left(\frac{x}{c}\right) \sin\theta + \frac{x^2}{2rc}. \quad (2)$$

The first term of equation (2), which varies linearly with x and depends only on the angle $\theta$, is the steering term. The second term, which is a quadratic function of x and depends only on range r, represents focusing. Thus, steering and focusing are independent and are conveniently achieved by two sets of linked delays, one set linear in x and one set quadratic in x. A slightly different form of this approximation for T, which has also been used, is $$T_2 = \left(\frac{x}{c}\right) \tan\theta + \frac{x^2}{2rc \cos\theta}, \quad (3)$$

which has the same properties as the approximation $T_1$ except that the focus term is a function of steering angle as well as range. In either case, however, the steering term is kept constant during the entire receive period between one transmit pulse and the next to give a line of sight with a constant steering angle, as described by Macovski (op. cit., at page 490).

Steering and focusing techniques which use the paraxial approximation have a significant disadvantage. There is a minimum range and a maximum steering angle for which the techniques can be used. The present invention permits the use of larger steering angles and shorter ranges. This is achieved by removing the requirements that steering and focusing be independent, and permitting both the linear and quadratic delay values to change with steering angle and range. Retention of the linear and quadratic delay organisation still permits the use of the compact and economical linked delay approach described above. A desirable, but not essential, additional feature of the present invention is the ability to vary the array aperture (for example, by selecting different numbers of elements of the array of transducers) as range and angle vary.

Consider the error $\epsilon$ in the first paraxial approximation for T.

$$T = T_1 + \epsilon \tag{4}$$

The error $\epsilon$ can itself be approximated by a linear term in x, a quadratic term in x and a residual as follows:

$$\epsilon = k_1 x + k_2 x^2 + k_3 \tag{5}$$

The coefficients $k_1$, $k_2$ and $k_3$ are functions of both range and angle. The required delay function T can thus be written as $$T = T_1 + k_1 x + k_2 x^2 + k_3 \tag{6}$$

$$= \left\{ \left( \frac{\sin \theta}{c} \right) + k_1 \right\} x + \left( \frac{1}{2rc} + k_2 \right) x^2 + k_3$$

$$= T_3 + k_3$$

By modifying the magnitudes of the linear and quadratic delay functions, an approximation $T_3$ for the desired delay function is obtained which has far less error than $T_1$ or $T_2$, particularly in those circumstances where the paraxial approximation is not valid.

$$T_3 = \left\{ \left( \frac{\sin \theta}{c} \right) + k_1 \right\} x + \left( \frac{1}{2rc} + k_2 \right) x^2 \tag{7}$$

Thus, according to the present invention, a method of steering and focusing a linear array of acoustic transducers comprises applying an independent delay to the signal received by each transducer of the array in accordance with a relationship which has both linear and quadratic terms in x, characterised in that
 (a) the linear term is a combination of a steering component which is a function of sin $\theta$ and x, together with a linear correction function; and
 (b) the quadratic term is a combination of a focusing component which is a function of r and $x^2$, with a quadratic correction function; where $\theta$ is the steering angle of the beam, r is the distance of the desired focus point of the beam from the centre of the array, and x is the distance of a transducer from the centre of the array.

Preferably, the independent delay T is in accordance with Equation (7) above.

Also according to the present invention, the apparatus for effecting steering and focusing of a linear array of acoustic transducers, each transducer adapted to generate an electrical signal when it receives acoustic signals, comprises, in combination:
 (a) a respective delay line connected to the electrical output of each transducer;
 (b) a respective voltage controlled oscillator connected to each delay line;
 (c) a respective digital to analogue converter connected to drive each voltage controlled oscillator;
 (d) a controller, adapted to generate digital signals to drive the digital to analogue converters; and
 (e) a summing amplifier, the input of which comprises the output signals of the delay lines.

Further according to the present invention, apparatus for effecting steering and focusing of a linear array of acoustic transducers, each transducer being supplied to generate an electrical signal when it receives acoustic signals, comprises, in combination:
 (a) a respective first and second delay line connected, in series, to the electrical output of each transducer, the lengths of the first delay lines varying linearly across the array and the lengths of the second delay lines varying quadratically across the array;
 (b) a first voltage controlled oscillator connected to each of said first delay lines;
 (c) a first digital to analogue converter connected to drive said first voltage controlled oscillator;
 (d) a second voltage controlled oscillator connected to each of said second delay lines;
 (e) a second digital to analogue converter connected to drive said second voltage controlled oscillator;
 (f) a controller, adapted to generate digital signals to drive said first and second digital to analogue converters; and
 (g) a summing amplifier, the input of which comprises the output signals from the series connected delay lines.

Preferably, the controller is a microprocessor. Usually the acoustic signals will be ultrasonic signals, typically echoes in ultrasonic echoscopy.

Figure 2:
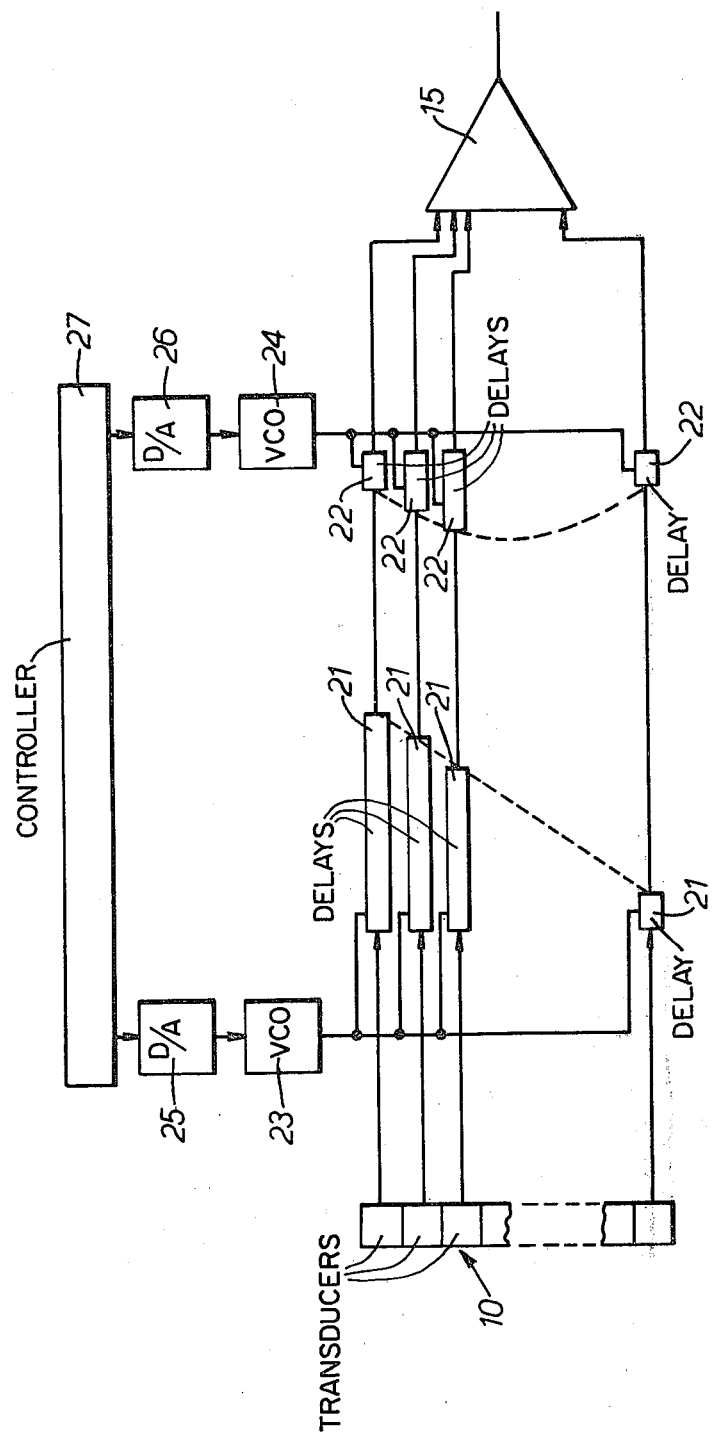

Two embodiments of the present invention will now be described with reference to the accompanying drawings, in which FIG. 1 is a diagram showing one form of apparatus that may be used to effect the steering and focusing method of the present invention, and FIG. 2 illustrates an alternative arrangement to that shown in FIG. 1.

In each embodiment there is a linear array of ultrasonic transducers 10, each transducer of which has an electrical output which is connected to a delay line. In the case of conventional ultrasonic echoscopy equipment, the array of transducers will first act as a transmitter, when each transducer is simultaneously excited by a pulse of electrical signals having an ultrasonic frequency. Following the pulse, the transducers are switched to their receive mode, in which any ultrasonic echo received by a transducer of the array is converted into an electrical signal by that transducer. It is the receive mode of the array of transducers that is featured in FIGS. 1 and 2.

In the embodiment of FIG. 1, the electrical signals from the transducers of array 10 are connected to respective CCD delay lines 11. A Fairchild CCD 321A may be used as each delay line 11. In general, a different delay is required for the output of each transducer, and hence a different clock frequency must be generated for each CCD delay line 11. The clock frequency for each delay line 11 is generated by a respective precision voltage controlled oscillator 12 (which may be, for example, a Dynamic Measurements Corporation VCO type 8710). The voltage controlled oscillators 12 are, in turn, controlled by the output of respective digital-to-analogue converters 13 (for example, Dynamic Measurements Corporation D/A converters type 2470). Digital signals to drive the digital-to-analogue converters 13 are generated by a controller 14. A microprocessor, such as Motorola type 6800, can conveniently be used for this purpose. However those skilled in this field will recognise that any appropriate programmable controller may be used.

The controller 14 is programmed to ensure that the delay time of each delay line 11 is in accordance with Equation (7) above, as the required scanning and focusing is effected to generate an echogram, using the output from summing amplifier 15, to which the signals from the transducers, after delay by delay lines 11, are applied. An operational amplifier such as Analogue Devices type 50J can be used as the summing amplifier 15.

The arrangement of FIG. 2 is similar, in that the signal from each transducer element is delayed separately, but in this arrangement two CCD delay lines 21 and 22 are used. The lengths of the delay lines 21 and 22 vary across the aperture, as shown schematically by the dashed lines in FIG. 2. The respective first delay lines 21 vary linearly with the position along the array; the set of second delay lines 22 varies quadratically along the array. An advantage of this embodiment is that only two voltage-controlled oscillators 23, 24 and respective digital-to-analogue converters 25, 26 are required to effect the required delay, so that controller 27 is considerably simplified. The summing amplifier 15 is the same as that used in the embodiment of FIG. 1.

Those skilled in this art will recognise that it is possible for all the CCD delay lines to be fabricated as a single integrated circuit, and that other, equivalent, circuit arrangements may be adopted to perform the method of the present invention.

To appreciate the effectiveness of the present invention, consider an array of ultrasonic transducers operating at a frequency of 3 MHz with a steering angle of 60° and a range of 10 mm. An aperture of 12.7 mm is required for medium focusing to be achieved. Use of the prior art approximations (approximations $T_1$ or $T_2$ given above) would result in a delay error of more than 1 microsecond, which is unacceptably large in ultrasonic echoscopy. Using the method and apparatus of the present invention, however, the worst delay for any transducer element is 93 nanoseconds which is less than a third of the signal period and is therefore quite acceptable in ultrasonic echoscopy. Thus, by changing the linear and the quadratic delay functions with both range and steering angle, the applicability of beam steering and focusing is considerably increased without sacrificing its inherent practical advantages of compactness, simplicity and economy.

I claim:

1. A method of steering and focusing a linear array of acoustic transducers comprising applying an independent delay to the signal received by each transducer of the array in accordance with a relationship which has both linear and quadratic terms in x, characterised in that
   (a) the linear term is a combination of a steering component which is a function of sin $\theta$ and x, together with a linear correction function; and
   (b) the quadratic term is a combination of a focusing component, which is a function of r and $x^2$ with a quadratic correction function;
   where $\theta$ is the steering angle of the beam, r is the distance of the desired focus point of the beam from the centre of the array, and x is the distance of a transducer from the centre of the array.

2. A method of steering and focusing a linear array of acoustic transducers comprising applying an independent time delay, T, to the signal received by each transducer of the array in accordance with the relationship $$T = \left\{ \left( \frac{\sin \theta}{c} \right) + k_1 \right\} x + \left\{ \frac{1}{2rc} + k_2 \right\} x^2$$

where $\theta$ is the steering angle of the beam, r is the distance of the desired focus point of the beam from the centre of the array, x is the distance of a transducer from the centre of the array, c is the velocity of propagation of the ultrasonic beam and $k_1$ and $k_2$ are functions of both $r + \theta$.

3. A method as defined in claim 1 or claim 2, in which the acoustic transducers are ultrasonic transducer.

4. A method as defined in claim 3, in which the signal obtained from the steered and focused array is used to form an ultrasonic echogram.

5. Apparatus for effecting steering and focusing of a linear array of acoustic ultrasonic transducers, each transducer being adapted to generate an electrical signal when it receives acoustic signals, comprising, in combination:
   (a) a respective delay line connected to the electrical output of each transducer;
   (b) a respective voltage controlled oscillator connected to each delay line;
   (c) a respective digital to analogue converter connected to drive each voltage controlled oscillator;
   (d) a controller, adapted to generate digital signals to drive the digital to analogue converters; and
   (e) a summing amplifier, the input of which comprises the output signals of the delay lines, said controller being programmed to enable a time delay T to be applied to the signals from the transducers in accordance with a relationship which has both steering and focusing terms, and wherein:
   the linear term is a combination of a function of sin $\theta$ and x, together with a linear function in x; and
   the quadratic term is a combination of a function of r and $x^2$ with a quadratic function of x;
   where $\theta$ is the steering angle of the beam, r is the distance of the desired focus point of the beam from the centre of the array, and x is the distance of a transducer from the centre of the array.

6. Apparatus for effecting steering and focusing of a linear array of acoustic ultrasonic transducers, each transducer being adapted to generate an electrical signal when it receives acoustic signals, comprising, in combination:
- (a) a respective delay line connected to the electrical output of each transducer;
- (b) a respective voltage controlled oscillator connected to each delay line;
- (c) a respective digital to analogue converter connected to drive each voltage controlled oscillator;
- (d) a controller, adapted to generate digital signals to drive the digital to analogue converters; and
- (e) a summing amplifier, the input of which comprises the output signals of the delay lines, said controller being programmed to enable a time delay T to be applied to the signals from the transducer in accordance with the relationship $$T = \left\{ \left( \frac{\sin \theta}{c} \right) + k_1 \right\} x + \left\{ \frac{1}{2rc} + k_2 \right\} x^2$$

where $\theta$ is the steering angle of the beam, r is the distance of the desired focus point of the beam from the centre of the array, x is the distance of a transducer from the centre of the array, c is the velocity of propagation of the ultrasonic beam and $k_1$ and $k_2$ are functions of both r and $\theta$.

7. Apparatus for effective steering and focusing of a linear array of acoustic ultrasonic transducers, each transducer being supplied to generate an electrical signal when it receives acoustic signals, comprising, in combination:
- (a) a respective first and second delay line connected, in series, to the electrical output of each transducer, the lengths of the first delay lines varying linearly across the array and the lengths of the second delay lines varying quadratically across the array;
- (b) a first voltage controlled oscillator connected to each of said first delay lines;
- (c) a first digital to analogue converter connected to drive said first voltage controlled oscillator;
- (d) a second voltage controlled oscillator connected to each of said second delay lines;
- (e) a second digital to analogue converter connected to drive said second voltage controlled oscillator;
- (f) a controller, adapted to generate digital signals to drive said first and second digital to analogue converters; and
- (g) a summing amplifier, the input of which comprises the output signals from the series connected delay lines, said controller being programmed to enable a time delay T to be applied to the signals from the transducers in accordance with a relationship which has both steering and focusing terms; and wherein:
the linear term is a combination of a function of $\sin \theta$ and x, together with a linear function in x; and the quadratic term is a combination of a function of r and $x^2$ with a quadratic function of x;
where $\theta$ is the steering angle of the beam, r is the distance of the desired focus point of the beam from the centre of the array, and x is the distance of a transducer from the centre of the array.

8. Apparatus for effective steering and focusing of a linear array of acoustic ultrasonic transducers, each transducer being supplied to generate an electrical signal when it receives acoustic signals, comprising, in combination:
- (a) a respective first and second delay line connected, in series, to the electrical output of each transducer, the lengths of the first delay lines varying linearly across the array and the lengths of the second delay lines varying quadratically across the array;
- (b) a first voltage controlled oscillator connected to each of said first delay lines;
- (c) a first digital to analogue converter connected to drive said first voltage controlled oscillator;
- (d) a second voltage controlled oscillator connected to each of said second delay lines;
- (e) a second digital to analogue converter connected to drive said second voltage controlled oscillator;
- (f) a controller, adapted to generate digital signals to drive said first and second digital to analogue converters; and
- (g) a summing amplifier, the input of which comprises the output signals from the series connected delay lines, said controller being programmed to enable a time delay T to be applied to the signals from the transducer in accordance with the relationship $$T = \left\{ \left( \frac{\sin \theta}{c} \right) + k_1 \right\} x + \left\{ \frac{1}{2rc} + k_2 \right\} x^2$$

where $\theta$ is the steering angle of the beam, r is the distance of the desired focus point of the beam from the centre of the array, x is the distance of a transducer from the centre of the array, c is the velocity of propagation of the ultrasonic beam and $k_1$ and $k_2$ are functions of both r and $\theta$.

* * * * *